Figure 1:
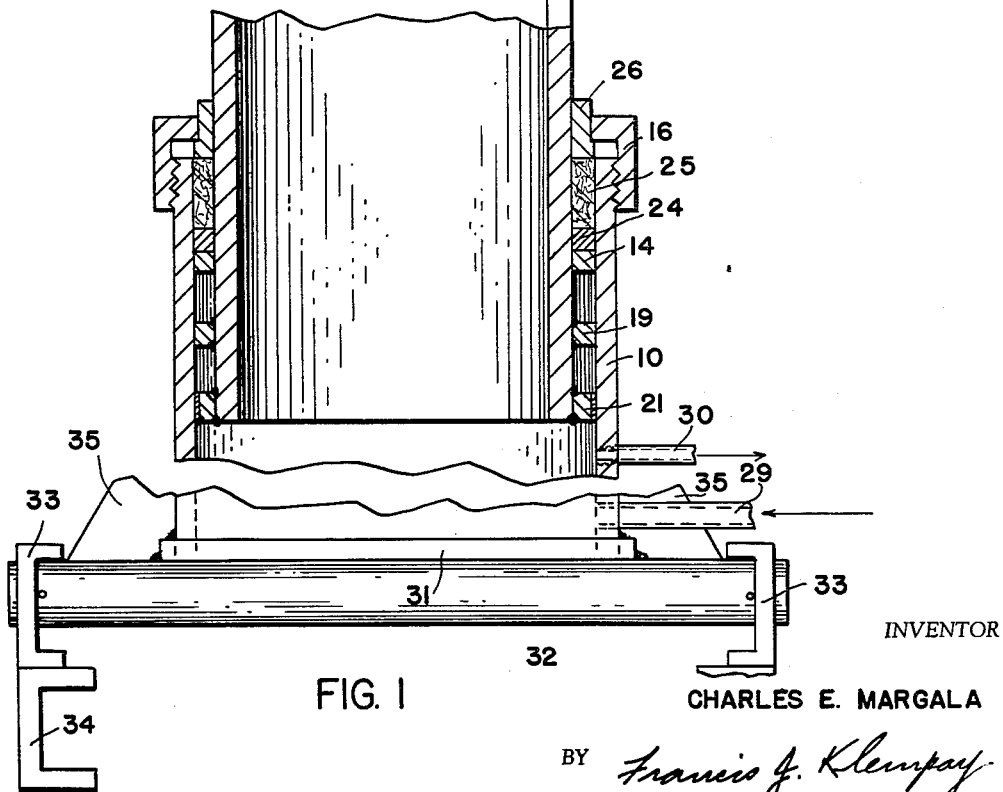

July 31, 1962                    C. E. MARGALA                    3,046,948
TELESCOPIC POWER CYLINDER AND METHOD OF MAKING SAME
Filed March 6, 1961

INVENTOR
CHARLES E. MARGALA
BY *Francis J. Klempay*
ATTORNEY

United States Patent Office 3,046,948
Patented July 31, 1962

3,046,948
TELESCOPIC POWER CYLINDER AND METHOD OF MAKING SAME
Charles E. Margala, 2610 Hubbard Road, Youngstown, Ohio
Filed Mar. 6, 1961, Ser. No. 93,723
2 Claims. (Cl. 121—46)

This invention relates to telescopic power cylinders and more particularly to improved yet simplified features of design for such cylinders and to improved yet simplified methods for manufacturing such cylinders. Telescopic cylinders are commonly employed for moving heavy loads through long strokes as, for example, in raising the forward ends of large heavily laden bodies of material-hauling road vehicles to dump the loads therefrom. In such applications the reactive forces are very large—requiring powerful moving forces and great columnar strength in the cylinder when extended. To keep the physical size and weight of the cylinders within practical limits it is desirable to reduce the side wall thicknesses of the tubing normally employed by employing high quality drawn tubing and to minimize the diameters of the tube sections by employing very high hydraulic pressures—5000 p.s.i. or more. Heretofore, these desirable objectives were obtained only at the expense of decreased strength and reliability and of intricate machining, making such cylinders extremely costly.

It is accordingly the primary object of this invention to improve the design and construction of telescopic cylinders whereby the same may have great strength yet be light in weight, small in size, capable of withstanding very high hydraulic pressures and be capable of being economically produced. An ancillary object of the invention, and one flowing inherently from the general principles of the invention, is the maximum utilization of the great dependable strength of high-quality cold drawn seamless tubing through the substantially elimination of machining on the tubing lengths. Machining normally has the effect of weakening the sections.

The above objects are accomplished by the present invention primarily by utilizing, as the principal structural elements of the cylinder, a plurality of lengths of cold drawn seamless tubing each being of uniform cross section throughout its length but being of graduated diameters to allow for telescoping. Welded to the inner and outer cylindrical surfaces of these lengths are stop and stabilizing rings which limit the relative outward movement of the tubing lengths or sections and which hold the assembled sections in axial alignment for maximum columnar strength. The rings are fairly accurately fitted and since weld beads of substantial length may be applied the rings are tightly held even with shallow penetration of weld heat. Thus, the principal structural components—the tubing lengths—are not weakened. Suitable bearing or low-friction metal to provide the sliding contact between the sections may be applied directly to certain of the welded rings or by means of additional rings as will appear below.

Figure 2:
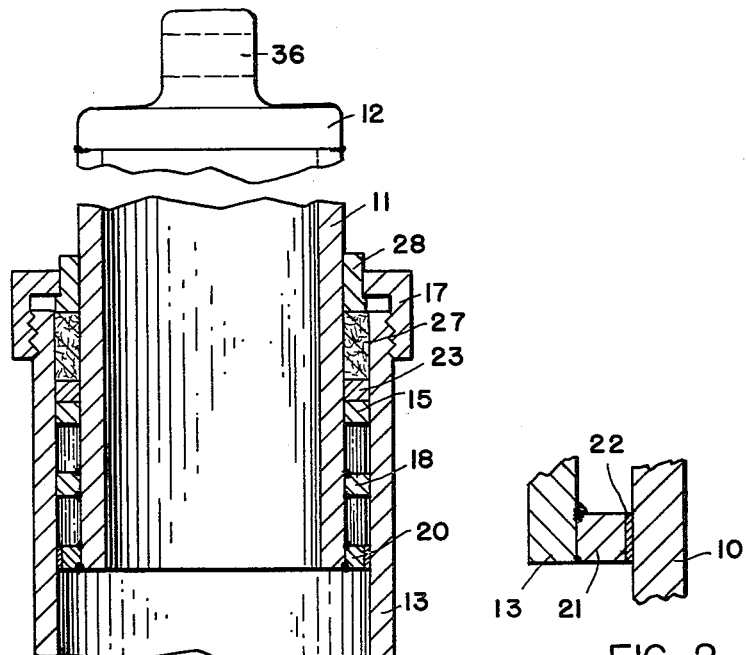

For a better understanding of the advantages provided by my invention reference is now made to a specific preferred embodiment of the invention as described in the following specification and shown in the accompanying drawing wherein:

FIGURE 1 is a longitudinal section of a telescopic cylinder constructed in accordance with the principles of the invention; and FIGURE 2 is a fragmentary sectional detail of the assembly of FIGURE 1.

While in the drawing I have shown a cylinder comprised of only three telescoping tube lengths or sections it should be obvious, as the description proceeds, that the principles of the invention are equally applicable to cylinders having a much larger number of sections and to a cylinder having but two sections. Reference numeral 10 designates a length of tubing which is of largest diameter in the assembly shown and which is preferably of high-quality cold drawn seamless tubing. Reference numeral 11 designates a length of the smallest diametered tubing which is closed off at its upper end by a cap 12 preferably welded thereto. An intermediate tubing length is shown at 13.

In the construction of the assembly of FIGURE 1, a steel ring is welded to the inner wall of each of the solid lengths 10 and 13, such ring in the length 10 being designated by the reference numeral 14 while such ring in the length 13 is designated by the numeral 15. As shown, the rings 14 and 15 are adjacent to but are spaced inwardly from the upper ends of the lengths 10 and 13, respectively, and these rings perform two functions. First, they serve as stop rings to cooperate with other stop rings to be hereinafter described to limit outward movement of the length 13 with respect to the base length 10 and outward movement of the length 11 with respect to the length 13. Secondly, the rings 14 and 15 serve as inner retainers for packings which are placed between lengths 10 and 13 and between lengths 13 and 11 to seal the oil in the assembly.

In actual practice the rings 14 and 15 may be obtained simply by cutting off short lengths of other seamless tubing as will be understood but, however obtained, it is desirable that the outer cylindrical surface of the rings have a snug sliding fit with the inner cylindrical surface of the tubing lengths 10 and 13 at time of assembly so that the rings may be rigidly and strongly secured within the tubing lengths with a minimum application of welding heat. It should be appreciated that the circumferential lengths of the interengagements of the rings with the tubing lengths are quite substantial so that very long welding beads may be drawn and even though the filets are quite small and the depth of penetration of the welding heat is rather shallow, the strength of the attachment will be quite substantial—particularly in an axial direction tending to drive the rings out of the tubing lengths. Of course, arc welding is preferably used and the sharp corners formed between the axial ends of the rings and the adjacent side walls of the tubing lengths provide excellent confining surfaces for the formation of the welding beads.

The tubing lengths 10 and 13 are formed at their upper end portions with shallow external threads to receive the internally threaded bezel rings 16 and 17, respectively. Since these threads may be quite fine and shallow they do not appreciably weaken the top end portions of the tubes 10 and 12 and, further, it should be noted that these threads are located where great strength in the tubing lengths is not required.

Welded to the outer walls of tubes 11 and 13 adjacent to but spaced upwardly from the bottom ends thereof are the stop rings 18 and 19, respectively, and, again, these rings are preferably solid steel, are sized to have a fairly close fit with the outer cylindrical surfaces of the tubing lengths, and are welded to the tubing lengths in the manner recited for rings 14 and 15. The function of rings 18 and 19 is to engage the rings 15 and 14, respectively, and thereby limit the outward movement of tube 11 with respect to tube 13 and the outward movement of tube 13 with respect to tube 10. A stabilizing ring 20 is welded to the outer surface of tube 11 at the bottom end thereof below the ring 18, and a similar ring 21 is similarly welded to the bottom end of tube 13. After the rings 20 and 21 are welded onto the tubes 11 and 13 the outer peripheries of these rings are metalized with brass or some other suitable low-friction metal to form a substantial adhered layer of such metal as shown at 22 in FIGURE 2. After metalizing the rings 20 and 21 may be turned or ground to provide an accurate sliding fit with the internal surfaces of the tubes 13 and 10, respectively.

It should be understood that with the parts described above being first assembled in the manner indicated the tubing length 11 may be inserted into the tubing length 13 from the bottom end thereof while the tubing length 13 may be inserted into the tubing length 10 from the bottom end thereof. At this final assembly a ring 23 of suitable bearing metal is placed immediately above the ring 15 in the tubing length 13, and in actual practice the internal diameter of ring 23 may be slightly smaller than the diameter of the ring 15 and is accurately formed to have a smooth sliding fit with the external surface of the tube 11. Thus the tube 11 is accurately guided for axial movement in the tube 13 by the bearings provided by the ring 23 and by the adhered layer on the outer periphery of ring 20. These bearing surfaces may eliminate all steel-to-steel rubbing contact and thereby prevent galling of the parts in actual use. It should also be noted that this construction enables the internal diameter of ring 15 to be initially made slightly oversize while the external diameter of ring 18 is undersized so that any distortion of the ring as may take place during welding will have not adverse effect in the final product. A ring 24 having the same function and relative specifications as the ring 23 is positioned in the tube 10 above the ring 14.

At final assembly the space within tube 10 above the ring 24 is filled with a suitable packing 25 which may be of the chevron type, for example, and engaging the top of this packing is a shouldered ring 26 made of brass or other anti-friction metal and carefully machined to have the snug sliding fit with the cylindrical outer surface of the tubing length 13. As shown, the shoulder on ring 26 is engaged by the inwardly directed flange of the bezel ring 16 so that as the latter is screwed down onto the tubing length 10 the packing 25 will be suitably compressed to accomplish its sealing function. It should be noted, additionally, that the ring 26 is effectively held against lateral movement by the ring 16 and since these parts are, in actual practice, made rather heavy the ring 26 will aid materially in lending lateral stability to the tubing length 13 with respect to the tubing length 10 and thereby increase the columnar strength of the assembly.

Positioned above the ring 23 in tubing length 13 is a packing 27 similar to packing 25 and, a shouldered anti-friction packing ring 28 is positioned within the bezel ring 17 to compress packing 27 and to assist in guiding the axial movement of tubing length 11.

One or more apertures may be made in the wall of the tubing length 10 to permit the ingress and egress of hydraulic fluid pressure which may be conducted, for example, by the conduits 29 and 30 shown in the drawing. After all of the tubing lengths, with rings attached as described above, are nested together in operative positions the lower end of the tubing length 10 may be sealed off by welding on a base plate 31. There is thus provided a complete closed telescoping cylinder assembly which will expand or extend when hydraulic fluid pressure is furnished the conduits 29 and 30 and which will collapse to a minimum overall length or height when a suitable closing force is applied and the hydraulic fluid allowed to bleed off through the conduits 29 and 30.

When the cylinder described above is used for dump truck service the base plate 31 may be welded to a heavy rock shaft 32 journaled in a superstructure 33 mounted on the vehicle frame 34. Gussets 35 may be secured between the shaft 32, plate 31, and tubing length 10 to lend lateral stability to the cylinder column while permitting the cylinder to pivot about the axis of the shaft 32. In actual practice the top cap 12 may be pivoted to a part of the movable dump body by means of a pin, not shown, which passes through a bore 36 formed in the cap 12—the axis of bore 36 being parallel with the shaft 32.

It should now be apparent that I have provided an improved telescopic cylinder assembly and an improved method of constructing the same which accomplishes the objects initially set out. Maximum use is made of simple lengths of commercial cold drawn seamless tubing which under present standards is highly accurate as to size and concentricity and is of great strength. The individual cut lengths are readily prepared for assembly simply by providing the threads or equivalent expedient to receive the packing rings and by welding on the desired rings as described above. So prepared, the individual lengths are readily assembled into the telescopic unit after which the assembly is closed by welding on the base plate 31.

The manufacture of the assembly is accomplished with a minimum of labor and because practically no machining is done on the walls of the seamless tube lengths the great strength of these principal components is unimpeded. As a result the assembly has maximum mechanical (columnar) and pressure strength for the size and weight of materials employed.

Having thus described my invention what I claim is new and desire to protect by Letters Patent is:

1. A telescopic power cylinder comprising a plurality of lengths of seamless steel tubing of graduated diameters and adapted to nest one within the other when the cylinder is collapsed, each of said lengths except the one of smallest diameter having welded to its inner wall a solid metal ring, each of said lengths except the one of largest diameter having welded to its outer wall and adjacent its inner end a solid metal ring, said second mentioned rings being adapted upon outward sliding movement of said lengths to contact said first mentioned rings and thereby limit the outward movement of all of said lengths except for the one of largest diameter, packing placed in the outer end portion of the tube lengths to which said first mentioned rings are respectively welded and retained by said rings, means carried by said outer end portions and encircling the outer walls of the next smaller diameter tube lengths to engage and compress said packings, solid metal stabilizing rings, devoid of grooves, welded to the outer wall of each of said tube lengths except the one of largest diameter and positioned at the inner ends of said lengths in spaced relation to the above second mentioned rings which are also welded onto said lengths, the outer peripheral surfaces of said stabilizing rings being faced with an adhering layer of low-friction metal of a thickness to provide an accurate sliding fit with the inner walls of the surrounding tubes, a cap for the outer free end of the tube length of smallest diameter, and a cap welded onto the free end of the tube length of largest diameter in fluid tight relation therewith to thus complete a telescopic closed cylinder which is operative to exert an expansive force between said caps.

2. Apparatus according to claim 1 further including a ring of low-friction metal in contact with each of said packings and adapted to slidably engage the outer walls of the tube lengths received in said packings, the arrangement being such that the telescoping of said tube lengths is guided primarily by said rings of low-friction metal and said layers of low-friction metal and while the first and second mentioned rings may be free of sliding contact with the tube lengths.

References Cited in the file of this patent

UNITED STATES PATENTS

| 2,517,153 | Wood | Aug. 1, 1950 |
| 2,783,744 | Tennis | Mar. 5, 1957 |
| 2,803,224 | Wilson | Aug. 20, 1957 |

FOREIGN PATENTS

| 108,820 | Australia | Oct. 26, 1939 |